(12) United States Patent
Ganzel

(10) Patent No.: US 11,447,118 B2
(45) Date of Patent: Sep. 20, 2022

(54) VEHICLE BRAKE SYSTEM AND DIAGNOSTIC METHOD FOR DETERMINING A LEAK IN A SIMULATOR VALVE

(71) Applicant: ZF Active Safety US Inc., Livonia, MI (US)

(72) Inventor: Blaise Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 401 days.

(21) Appl. No.: 16/687,759

(22) Filed: Nov. 19, 2019

(65) Prior Publication Data
US 2021/0146906 A1    May 20, 2021

(51) Int. Cl.
*B60T 17/22*      (2006.01)
*G07C 5/08*      (2006.01)
*G01M 3/28*      (2006.01)

(52) U.S. Cl.
CPC ......... *B60T 17/221* (2013.01); *G01M 3/2876* (2013.01); *G07C 5/0808* (2013.01)

(58) Field of Classification Search
CPC ... B60T 17/221; G01M 3/2876; G07C 5/0808
See application file for complete search history.

(56) References Cited

U.S. PATENT DOCUMENTS

| | | | |
|---|---|---|---|
| 4,445,333 A | 5/1984 | Coleman | |
| 11,224,749 B2* | 1/2022 | Plachta | A61N 1/36175 |
| 2012/0161505 A1 | 6/2012 | Koyama | |
| 2019/0184958 A1* | 6/2019 | Watanabe | B60T 13/686 |
| 2019/0248348 A1 | 8/2019 | Ganzel et al. | |
| 2020/0070793 A1* | 3/2020 | Yu | B60T 8/3265 |
| 2020/0339096 A1* | 10/2020 | Timm | B60T 13/686 |
| 2021/0061240 A1* | 3/2021 | Zhang | B60T 13/686 |
| 2021/0070273 A1* | 3/2021 | Timm | B60T 17/221 |
| 2021/0146907 A1* | 5/2021 | Ganzel | B60T 13/662 |
| 2021/0146908 A1* | 5/2021 | Ganzel | B60T 13/745 |

* cited by examiner

*Primary Examiner* — Eric S. McCall
(74) *Attorney, Agent, or Firm* — Robert James Harwood

(57) ABSTRACT

A diagnostic method to identify a leak in a simulator valve for a vehicle brake system comprising the steps of: (1) energizing a secondary three-way valve, a pumping valve, a simulator test valve, and a plurality of apply valves in order to maintain a pressure medium from a plunger assembly within a boost circuit; (2) applying a plunger in the plunger assembly to a predetermined pressure level; (3) holding the plunger in position within the plunger assembly; and (4) identifying a leak in a simulator valve via a signal from an ECU to a vehicle user interface if the pressure in the boost circuit deteriorates at or more than a pre-determined rate.

16 Claims, 4 Drawing Sheets

VEHICLE BRAKE SYSTEM AND DIAGNOSTIC METHOD FOR DETERMINING A LEAK IN A SIMULATOR VALVE

TECHNICAL FIELD

The present disclosure generally relates to a vehicle brake system and a diagnostic system for determining the existence of a leak in a simulator valve.

BACKGROUND

Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Some braking systems are configured such that the pressures at each of the wheel brakes can be controlled independently (referred to as a multiplexing operation) from one another even though the brake system may include a single source of pressure. Thus, valves downstream of the pressure source are controlled between their open and closed positions to provide different braking pressures within the wheel brakes. Such multiplex systems, which are all incorporated by reference herein, are disclosed in U.S. Pat. No. 8,038, 229, U.S. Patent Application Publication No, 2010/0016083, U.S. Patent Application Publication No. 2012/0013173, and U.S. Patent Application Publication No, 2012/0136261.

The above information disclosed in this Background section is only for enhancement of understanding of the background of the invention, and therefore, it may contain information that does not form the prior art that is already known in this country to a person of ordinary skill in the art.

SUMMARY

In a first embodiment, a diagnostic method for a vehicle brake system is provided to identify a leak in a simulator valve for the vehicle brake system. The method includes the following steps: (1) energizing a secondary three-way valve, a pumping valve, a simulator test valve, and a plurality of apply valves in order to maintain a pressure medium from a plunger assembly within a boost circuit; (2) applying a plunger in the plunger assembly to achieve a predetermined pressure level within a boost circuit; (3) holding the plunger in position within the plunger assembly; and (4) identifying a leak in a simulator valve via a signal from an ECU to a vehicle user interface if the pressure in the boost circuit deteriorates at or more than a pre-determined rate. It is understood that the foregoing diagnostic method may be performed in a vehicle brake system having two modules wherein the reservoir is disposed in a first module while the simulator test valve is disposed in a second module separate from the first module.

The vehicle brake system may further include a boost pressure sensor which is used to measure pressure in the boost circuit in steps 2 and 4 above. Moreover, in the foregoing method, the step of energizing the plurality of apply valves prevents pressure medium from flowing from plurality of apply valves toward a corresponding plurality of dump valves, and energizing the simulation test valve blocks the flow of fluid or pressure medium in the direction from the simulation chamber to the first output pressure chamber of the master cylinder. Similarly, the step of energizing the pumping valve so as to encourage pressure medium to freely flow from the plunger assembly into the boost circuit under the circumstances (as the energized pumping valve enables bi-directional flow.) The parallel venting valve is also enabled to have bi-directional flow (although via a de-energized state) to also encourage pressure medium to freely flow from the plunger assembly into the boost circuit. Accordingly, the pressure medium may be maintained in the boost circuit in order to build up the pressure in the boost circuit to the desired pre-determined level. A pressure sensor in the boost circuit measures the rate of pressure deterioration in the boost circuit.

In order to apply pressure to the boost circuit via a plunger in the plunger assembly, an electronic control unit actuates a motor in the plunger assembly which then causes the plunger to translate within the plunger assembly.

The first embodiment method of the present disclosure may further include the optional steps to perform a diagnostic test for a leak in the pedal simulator which includes the additional steps of: (5) de-energizing the simulator test valve to release pressure in the boost circuit; (6) energizing the pedal simulator valve to enable bi-directional flow within the pedal simulator valve from the pedal simulator to the boost circuit and energizing the simulator test valve (enabling uni-directional flow) which blocks the flow of fluid or pressure medium in the direction from the simulation chamber to the first output pressure chamber of the master cylinder; (7) applying pressure to the pedal simulator via a plunger assembly until a predetermined pressure is achieved in the pedal simulator; (8) holding a plunger in the plunger assembly in position and measuring a rate of pressure deterioration in the pedal simulator; and (9) comparing the rate of pressure deterioration in the pedal simulator against a predetermined rate to identify a leak in the pedal simulator.

In a second embodiment diagnostic method of the present disclosure, the steps to determine a leak in the simulator valve of a vehicle brake system may include the steps of: (1) energizing a secondary three-way valve, a pumping valve, a simulator test valve, and a plurality of apply valves in order to maintain a pressure medium from a plunger assembly within a boost circuit; (2) applying pressure to the boost circuit via a plunger in the plunger assembly to achieve a predetermined pressure level in the boost circuit; (3) holding the plunger in position and measuring the pressure in the boost circuit; (4) measuring a rate of pressure deterioration in the boost circuit via a boost pressure sensor; and (5) comparing the rate of pressure deterioration against a predetermined value; and (6) identifying a leak in the simulator valve via a signal from an ECU to a vehicle user interface if the plunger traveled more than a pre-determined distance within the plunger assembly when achieving the predetermined pressure level in the boost circuit. Similar to the first embodiment, the reservoir may be disposed in a first module while the simulator test valve is disposed in a second module separate from the first module. The pre-determined distance for the plunger may, but not necessarily, fall in the range of about 5 mm to about 20 mm.

Moreover, in the foregoing method, the step of energizing the plurality of apply valves prevents pressure medium from flowing from plurality of apply valves toward a corresponding plurality of dump valves, and energizing the simulation test valve blocks the flow of pressure medium in the direction from the simulation chamber to the first output pressure chamber of the master cylinder. Similarly, the step of energizing the pumping valve (which enables the bi-directional flow of the pressure medium within the valve) encourages pressure medium to flow from the plunger assembly into the boost circuit under the circumstances. Accordingly, the pressure medium may be maintained in the boost circuit in order to build up the pressure in the boost circuit to the desired pre-determined level. A pressure sensor in the boost circuit measures the rate of pressure deterioration in the boost circuit.

Similar to the first embodiment method, the second embodiment method may include the optional, but not necessary steps, to determine whether there is a leak in the pedal simulator such the following additional steps may be performed: (7) de-energizing the simulator test valve to release pressure in the boost circuit; (8) energizing the pedal simulator valve and the simulator test valve wherein the step of energizing the pedal simulator valve encourages pressure medium to flow from the pedal simulator to the boost circuit under the circumstances (as bi-directional flow is enabled when the pedal simulator valve is energized) and wherein the step of energizing the simulator test valve blocks the flow of fluid or pressure medium in the direction from the simulation chamber to the first output pressure chamber of the master cylinder (as uni-directional flow is enabled when the simulator test valve is energized; (9) applying pressure to the pedal simulator via a plunger assembly in a second module until a predetermined pressure is achieved in the pedal simulator; (10) holding a plunger in the plunger assembly in position and measuring a rate of pressure deterioration in the pedal simulator; and (11) comparing the rate of pressure deterioration in the pedal simulator against a predetermined rate to identify a leak in the pedal simulator.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
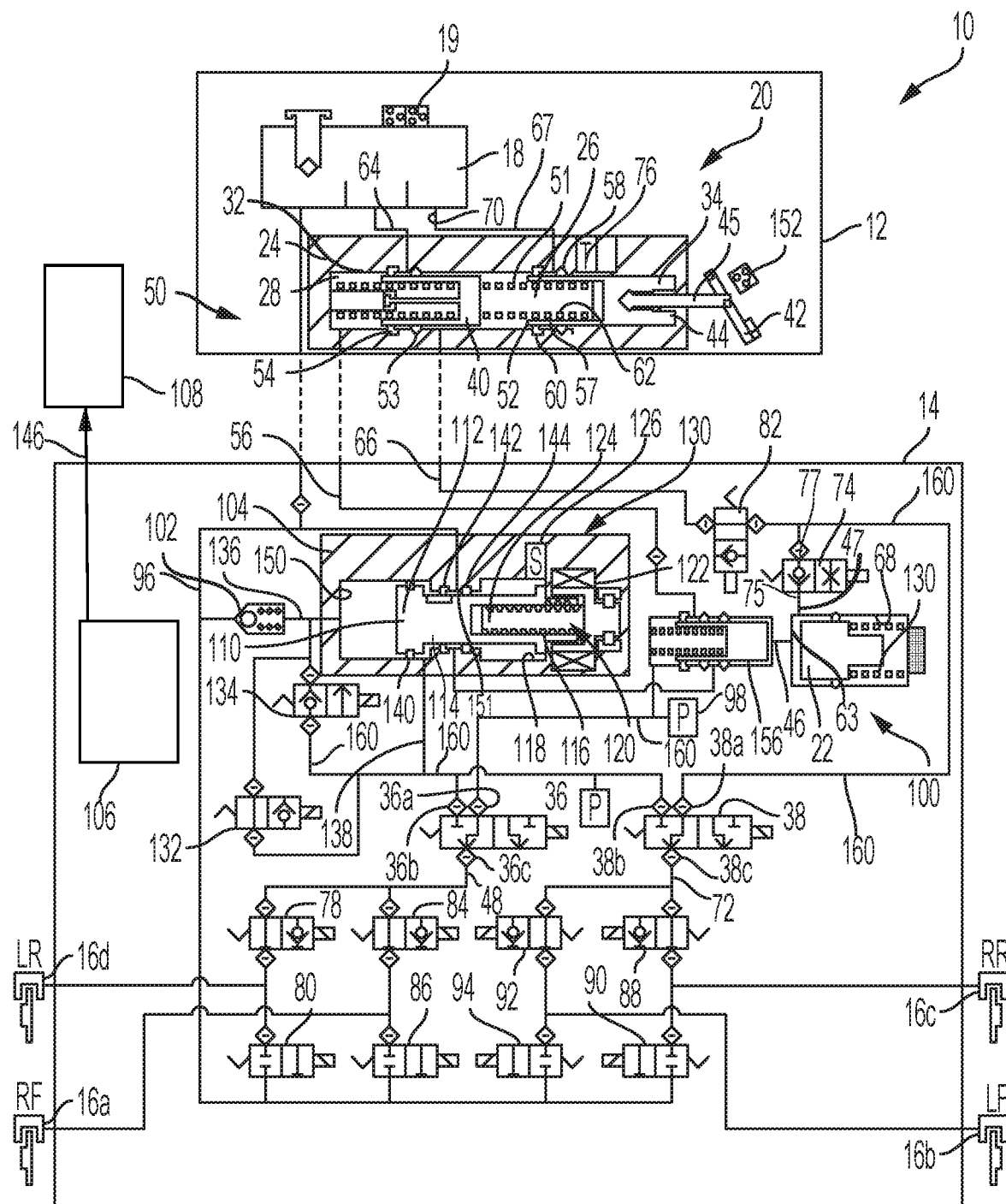
FIG. 1A is a first schematic diagram of a first braking system according to the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," an, and the comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 1B:
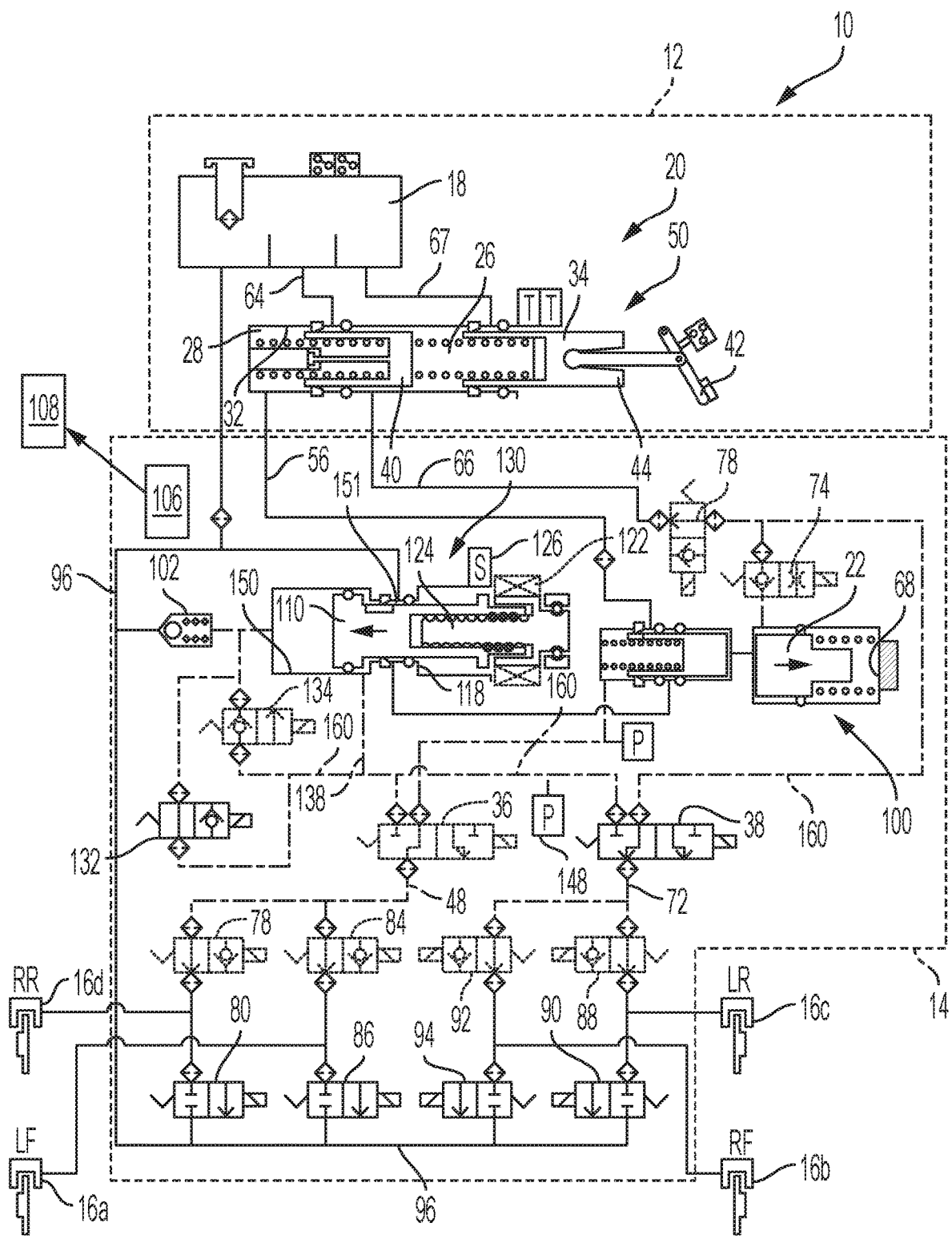
FIG. 1B is a second schematic diagram of the first braking system in FIG. 1A wherein the simulator piston moves rear/right-ward as the plunger in the plunger assembly advances (moves forward/left) and applies pressure to the boost circuit.

Referring now to the drawings, there is schematically illustrated in FIGS. 1A-1B a first embodiment of a vehicle brake system, indicated generally at 10. All valves of the brake system 10 are entirely disposed within the HCU which is configured to drive valves. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a first block or brake pedal unit assembly, indicated by broken lines 12, and a second block or hydraulic control unit, indicated by broken lines 14. The various components of the brake system 10 are housed in the brake pedal unit assembly 12 and the hydraulic control unit 14. As indicated, the brake pedal unit assembly 12 does not implement any valves. The brake pedal unit assembly 12 and the hydraulic control unit 14 may include one or more blocks or housings made from a solid material, such as aluminum, that has been drilled, machined, or otherwise formed to house the various components. Fluid conduits may also be formed in the housings to provide fluid passageways between the various components. The housings of the brake pedal unit assembly 12 and the hydraulic control unit 14 may be single structures or may be made of two or more parts assembled together. As schematically shown, the hydraulic control unit 14 is located remotely from the brake pedal unit assembly 12 with hydraulic lines hydraulically coupling the brake pedal unit assembly 12 and the hydraulic control unit 14.

The brake pedal unit assembly 12 cooperatively acts with the hydraulic control unit 14 for actuating wheel brakes 16*a*, 16*b*, 16*c*, and 16*d*. The wheel brakes 16*a*, 16*b*, 16*c*, and 16*d* can be any suitable wheel brake structure operated by the application of pressurized brake fluid (or pressure medium). The wheel brake 16*a*, 16*b*, 16*c*, and 16*d* may include, for example, a brake caliper mounted on the vehicle to engage a frictional element (such as a brake disc) that rotates with a vehicle wheel to effect braking of the associated vehicle wheel. The wheel brakes 16*a*, 16*b*, 16*c*, and 16*d* can be associated with any combination of front and rear wheels of the vehicle in which the brake system 10 is installed. For example, for a vertically split system, the wheel brakes 16*a* and 16*d* may be associated with the wheels on the same axle. For a diagonally split brake system, the wheel brakes 16*a* and 16*b* may be associated with the front wheel brakes.

The brake pedal unit assembly 12 includes a fluid reservoir 18 for storing and holding hydraulic fluid for the brake system 10. The fluid within the reservoir 18 may be held generally at atmospheric pressure or can store the fluid at other pressures if so desired. The brake system 10 may include a fluid level sensor 19 for detecting the fluid level of the reservoir. The fluid level sensor 19 may be helpful in determining whether a leak has occurred in the system 10.

The brake pedal control unit assembly 12 includes a brake pedal unit (BPU), indicated generally at 20. It should be understood that the structural details of the components of the brake pedal unit 20 illustrate only one example of a brake pedal unit 20. The brake pedal unit 20 could be configured differently having different components than that shown in FIGS. 1A-1B.

The brake pedal unit 20 includes a housing 24 having various bores formed in for slidably receiving various cylindrical pistons and other components therein. The housing 24 may be formed as a single unit or include two or more separately formed portions coupled together. The housing 24 generally includes a bore 32, Bore 32 may have varying diameters as shown in FIGS. 1A-1B, The brake pedal unit 20 further includes an input piston (or primary piston) 34 and an output piston (or secondary piston) 40. The input piston 34 and the output piston 40 may be slidably disposed in the bore 32.

A brake pedal, indicated schematically at 42 in FIGS. 1A-1B, is coupled to a first end 44 of the input piston 34 via an input rod 45. The input rod 45 can be coupled directly to the input piston 34 or can be indirectly connected through a coupler (not shown). In the rest position shown in FIG. 1A, an outer cylindrical surface 57 of the input piston 34 is engaged with a seal 58 and a lip seal 60 mounted in grooves formed in the housing 24. The input piston 34 includes a central bore 62 formed through the second end 52. The brake pedal unit 20 is in a "rest" position as shown in FIG. 1A. The conduit 66 is also in fluid communication with a first output pressure chamber 26 formed in the housing 24. The conduit 66 is in fluid communication with a reservoir port 70 connected to the reservoir 18. A filter (not shown) may be disposed in the port 70 or the conduit 66. The conduit 66 can be formed by various bores, grooves and passageways formed in the housing 24.

The pedal simulator 100 includes a chamber, a spring 130 and a piston 22. It should be understood that that the various springs of the pedal simulator 100 may have any suitable spring coefficient or spring rate. The simulation chamber 63 may have brake fluid and may be in fluid communication with a conduit 47 which is in fluid communication with the simulation valve 74. It is understood that region 68 is the dry region of the simulation chamber 63 because region 68 is the other side of the simulator piston). A filter (not shown) may be housed within the conduit 47. Simulator test valve 82 is also provided in the hydraulic control unit 14 so that the two-way flow of the simulator valve 74 may be independently opened or closed without causing the brake fluid to flow back into the master cylinder pressure chamber and/or reservoir.

As discussed above, the brake pedal unit 20 includes the input and output pistons 34 and 40 that are disposed in bore 32 which is formed in the housing 24. The input and output pistons 34 and 40 are generally coaxial with one another. A secondary output conduit 56 is formed in the housing 24 and is in fluid communication with the second output pressure chamber 28. The secondary output conduit 56 may be extended via external piping or a hose connected to the housing 24. A primary output conduit 66 is formed in the housing 24 and is in fluid communication with the first output pressure chamber 26. The primary output conduit 66 may be extended via external piping or a hose connected to the housing 24. As will be discussed in detail below, leftward movement of the input and output pistons 34 and 40, as viewing FIGS. 1A-1B, provides pressurized fluid out through the secondary output conduit 56 and the primary output conduit 66. A return spring 51 is housed in the first output pressure chamber 26 and biases the input piston 34 in the rightward direction.

The output piston 40 is slidably disposed in the bore 32. A second output pressure chamber 28 is generally defined by the bore 32, the output piston 40, and the lip seal 54. Leftward movement of the output piston 40 causes a buildup of pressure in the second output pressure chamber 28. The second output pressure chamber 28 is in fluid communication with the secondary output conduit 56 such that pressurized fluid is selectively provided to the hydraulic control unit 14. Second output pressure chamber 28 is in selective fluid communication with a conduit 64 which is in fluid communication with the reservoir 18.

A first output pressure chamber 26 is generally defined by the bore 32, the input piston 34, the output piston 40, the lip seal 60, and the seal 53. Although the various seals shown in the drawings are schematically represented as O-ring or lip seals, it should be understood that they can have any configuration. Leftward movement of the input piston 34 causes a buildup of pressure in the first output pressure chamber 26. The first output pressure chamber 26 is in fluid communication with the primary output conduit 66 such that pressurized fluid is selectively provided to the hydraulic control unit 14.

Referring again to FIGS. 1A-1B, the system 10 may further include a travel sensor 76 for producing a signal that is indicative of the length of travel of the input piston 34 which is indicative of the pedal travel. The system 10 may also include a switch 152 for producing a signal for actuation of a brake light and to provide a signal indicative of movement of the input piston 34. The brake system 10 may further include sensors such as pressure transducers for monitoring the pressure in the conduit 56.

The system 10 further includes a source of pressure in the form of a plunger assembly, indicated generally at 130. As will be explained in detail below, the system 10 uses the plunger assembly 130 to provide a desired pressure level to the wheel brakes 16 *a-d* during a normal boosted brake apply. Fluid from the wheel brakes 16*a*-16*d* may be returned to the plunger assembly 130 or diverted to the reservoir 18.

The system 10 further includes a primary 3-way valve 38 and a secondary 3-way valve 36 (or referred to as switching valves or base brake valves). The three-way valves 36 and 38 may be solenoid actuated three-way valves. The three-way valves 36 and 38 are generally operable to up to three positions, as schematically shown in FIGS. 1A-1B. It is understood that three-way valve 38 is hydraulically moved to a "third" position during self-diagnostic testing as described herein. The secondary 3-way valve 36 has a port 36*a* in selective fluid communication with the secondary output conduit 56 which is in fluid communication with the second output pressure chamber 28. A port 36*b* is in fluid communication with a boost conduit 160. A port 36*c* is in fluid communication with a conduit 48 which is selectively in fluid communication with the wheel brakes 16*a* and 16*d*. The primary 3-way valve 38 has a port 38*a* in selective fluid communication with the conduit 66 which is in fluid communication with the first output pressure chamber 26. A port 38*b* is in fluid communication with the boost conduit 160. A port 38*c* is in fluid communication with a conduit 72 which is selectively in fluid communication with the wheel brakes 16*b* and 16*c*.

The system 10 further includes various valves (slip control valve arrangement) for permitting controlled braking operations, such as ABS, traction control, vehicle stability control, and regenerative braking blending. A first set of valves includes an apply valve 78 and a dump valve 80 in fluid communication with the conduit 48 for cooperatively supplying brake fluid received from the plunger assembly 130 to the wheel brake 16*d*, and for cooperatively relieving pressurized brake fluid from the wheel brake 16*d* to the reservoir conduit 18 via the reservoir conduit 96. A second set of valves include an apply valve 84 and a dump valve 86 in fluid communication with the conduit 48 for cooperatively supplying brake fluid received from the plunger assembly 130 to the wheel brake 16*a*, and for cooperatively relieving pressurized brake fluid from the wheel brake 16*a* to the reservoir conduit 96. A third set of valves include an apply valve 88 and a dump valve 90 in fluid communication with the conduit 72 for cooperatively supplying brake fluid received from the plunger assembly 130 to the wheel brake 16*c*, and for cooperatively relieving pressurized brake fluid from the wheel brake 16*c* to the reservoir conduit 96. A fourth set of valves include an apply valve 92 and a dump valve 94 in fluid communication with the conduit 72 for cooperatively supplying brake fluid received from plunger assembly 130 to the wheel brake 16*b*, and for cooperatively relieving pressurized brake fluid from the wheel brake 16*b* to the reservoir conduit 96.

As stated above, the system 10 includes a source of pressure in the form of the plunger assembly 130 to provide a desired pressure level to the wheel brakes 16*a-d*. The system 10 further includes a venting valve 132 and a pumping valve 134 which cooperate with the plunger assembly 130 to provide boost pressure to the boost conduit 160 for actuation of the wheel brakes 16*a*-16*d*. The venting valve 132 and the pumping valve 134 may be solenoid actuated valves movable between open positions and closed positions. In the closed position, the venting valve 132 and the pumping valve 134 may still permit flow in one direction as schematically shown as a check valve in FIGS. 1A-1B. The venting valve 132 is in fluid communication with a first output conduit 136 which is in fluid communication with the plunger assembly 130. A second output conduit 138 is in fluid communication between the plunger assembly 130 and the boost conduit 160.

The plunger assembly 130 includes a housing 104 having a multi-stepped bore 118 formed therein. A piston 110 is slidably disposed with the bore 118. The piston 110 includes an enlarged end portion 112 connected to a smaller diameter central portion 114. The piston 110 has a second end 116 connected to a ball screw mechanism, indicated generally at 120. The ball screw mechanism 120 is provided to impart translational or linear motion of the piston 110 along an axis defined by the bore 118 in both a forward direction (leftward as viewing FIGS. 1A-1B), and a rearward direction (rear/right-ward as viewing FIGS. 1A-1B) within the bore 118 of the housing 104. In the embodiment shown, the ball screw mechanism 120 includes a motor 122 rotatably driving a screw shaft 124. The motor 122 may include a sensor 126 for detecting the rotational position of the motor 122 and/or ball screw mechanism 120 which is indicative of the position of the piston 110. The second end 116 of the piston 110 includes a threaded bore and functions as a driven nut of the ball screw mechanism 120. The ball screw mechanism 120 includes a plurality of balls that are retained within helical raceways formed in the screw shaft 124 and the threaded bore of the piston 110 to reduce friction. Although a ball screw mechanism 120 is shown and described with respect to the plunger assembly 130, it should be understood that other suitable mechanical linear actuators may be used for imparting movement of the piston 110. It should also be understood that although the piston 110 functions as the nut of the ball screw mechanism 120, the piston 110 could be configured to function as a screw shaft of the ball screw mechanism 120. Of course, under this circumstance, the ball nut would rotate and the screw shaft would translate so as to move the plunger 110 relative to the multi-stepped bore 118 as the ball nut is rotated via the motor 122.

As will be discussed in detail below, the plunger assembly 130 can provide boosted pressure to the boost conduit 160 when actuated in both the forward and rearward directions. The plunger assembly 130 includes a seal 140 mounted on the enlarged end portion 112 of the piston 110. The seal 140 slidably engages with the inner cylindrical surface of the bore 118 as the piston 110 moves within the bore 118. A pair of seals 142 and 144 is mounted in grooves formed in the bore 118, The seals 142 and 144 slidably engage with the outer cylindrical surface of the piston 110. A first pressure chamber 150 is generally defined by the bore 118, the enlarged end portion 112 of the piston 110, and the seal 140. A second pressure chamber 151, located generally behind the enlarged end portion 112 of the piston 110, is generally defined by the bore 118, the seals 142 and 140, and the piston 110. The seals 140, 142, and 144 can have any suitable seal structure. In one embodiment, the seal 140 is a quad ring seal. Although a lip seal may also be suitable for the seal 140, a lip seal is more generally more compliant and requires more volume displacement for a given pressure differential. This may result in a small boost pressure reduction when the piston 110 travels in the rearward direction during a pumping mode. The lip seal or seal 140 may be provided in the form of an O-ring energized PTFE seal because this component can tolerate big extrusion gaps.

As shown in FIGS. 1A-1B, the hydraulic control unit 14 also includes a simulator test valve 82 and a simulator valve 74 which may be mounted proximate to the brake simulator. The simulator test valve 82 is generally not used during a normal boosted brake apply or even for a manual push-through mode. The simulator test valve may be energized or de-energized during various testing modes to determine the correct operation of the brake system 10. The simulator test valve 82 may be de-energized to a "closed position" to prevent venting pressure medium away from the primary output chamber via the conduit 66 such that a pressure build up in conduit 160 can be used to monitor fluid (or pressure medium) flow to determine if leaks may be occurring through seals of various components of the brake system 10.

As schematically shown in FIGS. 1A-1B, the simulation valve 74 may be a solenoid actuated valve. The simulation valve 74 includes a first port 75 and a second port 77. The first port 75 is in fluid communication with the conduit 47 and the simulation chamber 63 of the simulator 100. The second port 77 is in fluid communication with the reservoir 18 via the conduits 66 and 70. The simulation test valve 82 is movable between a first open (de-energized) position allowing the flow of fluid from the simulation chamber 63 to the first output pressure chamber 26, and a second closed position blocking flow of fluid or pressure medium between the first output pressure chamber 26 and the simulation chamber 63 only in direction from simulator to master cylinder. The simulation valve 74 is in the first closed position or normally closed position when not actuated (not energized) such that fluid is prevented from flowing into the simulation chamber 63 through conduit 160.

The simulator valve 74 may be energized together with the apply valves 78, 84, 92, 88 and while the simulator test valve 82 is energized (so as to close/block pressure medium from flowing from conduit 160 to conduit 66) and the simulator valve 74 is energized so as to open simulator valve 74 (to increase fluid flow through simulator valve 74) so that the dual acting plunger 110 can be used to fill the pedal simulator 100 via conduit 160 with the pressure medium so that the system may perform self-diagnostic tests as later described herein.

Example, non-limiting diagnostic operations of the aforementioned system may include: (1) a diagnostic test for a leak in the Simulator Valve; (2) an optional diagnostic test for a leak in the Pedal Simulator; and/or (3) a diagnostic test for a leak in the primary and/or secondary three-way valves.

In order to perform a diagnostic test for a leak in the simulator valve 74 in the example system of FIG. 1A, the system 10 may perform the following steps: (1) energize the secondary three-way valve 36, the pumping valve 134, the simulator test valve 82, and the apply valves 78, 84, 88, 92 in order to maintain brake fluid from the plunger assembly 130 within the boost circuit 160; (2) Apply the dual acting plunger 110 in the plunger assembly 130 to a predetermined pressure level such as 30 Bar in the boost circuit 160 wherein the boost pressure sensor 148 is used to determine the pressure level in the boost circuit 160; (3) Hold the plunger 110 in position within the plunger assembly and if the pressure in the boost circuit 160 deteriorates at or more than a pre-determined rate (ex: more than 20 Bar in 100 msec), then identify a leak in the simulator valve 74 via a signal from the ECU 106 to a vehicle user interface 108. Alternatively, if the plunger 110 has to travel more than a pre-determined distance (ex: 4 mm) in order to achieve a pressure of 30 Bar in the boost circuit 160 (at step 2), then identify a leak in the simulator valve 74 via a signal 146 from the ECU 106 to a vehicle user interface 108.

Following the test for a leak in the simulator valve 74 and with reference to FIG. 1B, the system 10 may perform another diagnostic test for a leak in the pedal simulator 100 by performing the following steps: (1) de-energize the simulator test valve 82 to release pressure; (2) energize the pedal simulator valve 74 and then energize the simulator test valve 82; (3) apply the dual acting plunger 110 (while energizing the secondary three-way valve 36, the pumping valve 134, the simulator test valve 82, and the apply valves 78, 84, 88, 92) to achieve a predetermined pressure in the pedal simulator 100; (4) hold the dual acting plunger 110 in position once the predetermined pressure has been achieved in the pedal simulator and if the pressure in the in the pedal simulator 100 deteriorates at a pre-determined rate (ex: more than 3 Bar in 100 msec), then identify a leak in the pedal simulator 100 via a signal 146 from the ECU 106 to a vehicle user interface 108. Alternatively, if the dual acting plunger 110 in the plunger assembly 130 has to travel more than a pre-determined distance (ex: 5 mm to 20 mm) in order to achieve a pressure of 10 Bar in the pedal simulator (at step 3) then identify a leak in the pedal simulator 100 via a signal 146 from the ECU 106 to a vehicle user interface 108.

Following the test of the pedal simulator 100 for leaks, the above-referenced system 10 may also test for a leak in the three-way valves 36, 38. However, before testing for a leak in the three-way valves 36, 38, any boost pressure from the previous test must be released. Thus, if boost pressure is still maintained in boost circuit 160 from the pedal simulator test, release boost pressure from the boost circuit 160 by de-energizing the simulator test valve 82 and moving the plunger 110 to the home position.

Once the boost pressure has been reduced in the boost circuit 160, the method for testing for a leak in the three way valves includes the following steps: (1) fill the pedal simulator 100 using the same method used as was used in the aforementioned simulator leak detection process/method; (2) De-energize the secondary 3-way valve and then retract the dual acting plunger to the home position to further drop the pressure in the boost circuit to zero while also monitoring the master cylinder secondary pressure sensor 98 (which is indicative of pressure at the output of the fluid separator 156 during this test method); (3) Determine whether there is a pressure reduction at the secondary master cylinder pressure sensor 98. If the pressure deteriorates at a pre-determined rate (more than 7 bar in 100 msec), then then identify a leak in the three-way valves 36, 38 via a signal from the ECU to a vehicle user interface. However, if the pressure drop does not exceed the predetermined threshold, then the HCU determines that there is not a leak in either of the three-way valves 36, 38.

Figure 2A:
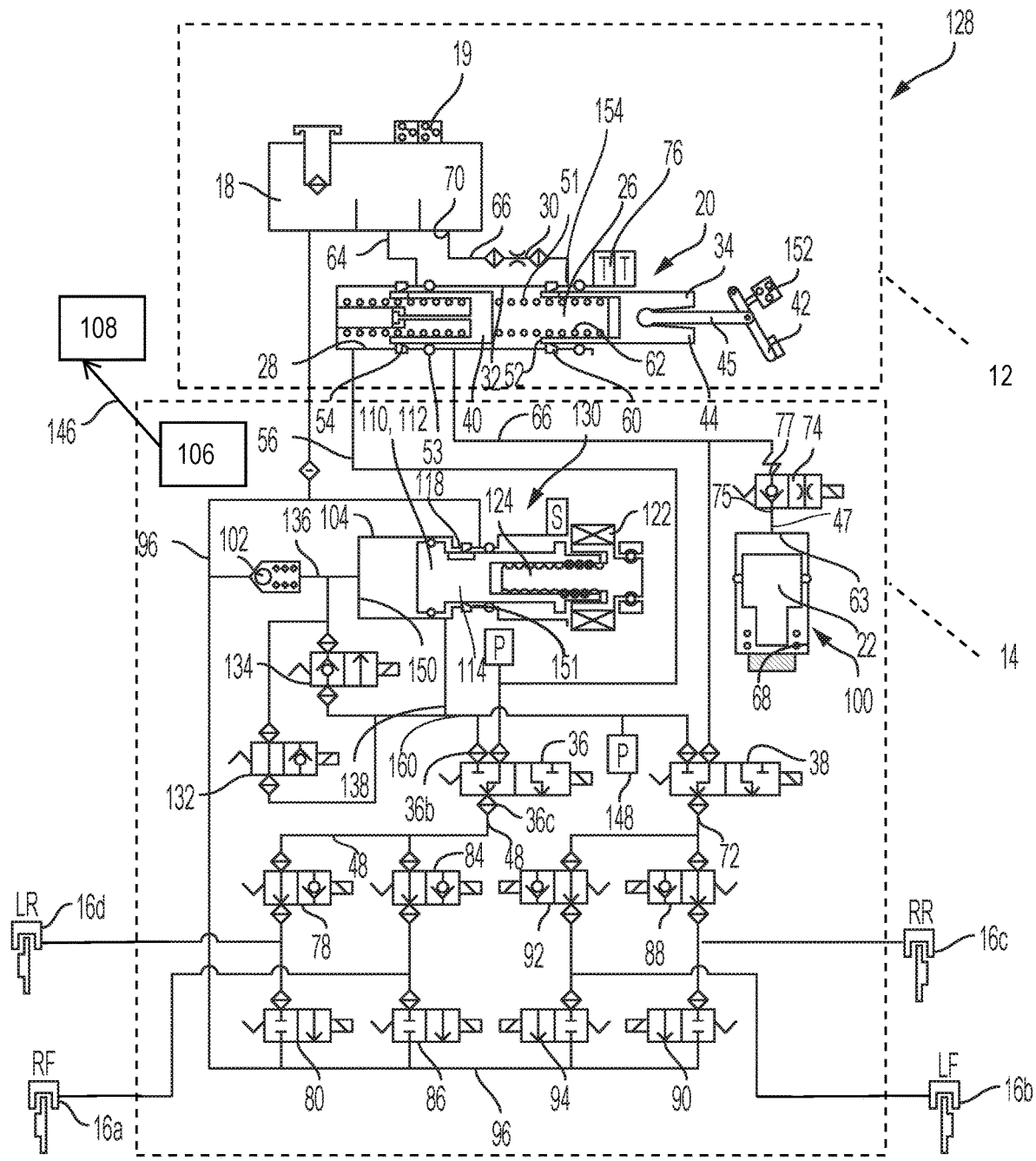
FIG. 2A is a schematic diagram of a second braking system according to the present disclosure where the simulator is filled with pressure medium.
Figure 2B:
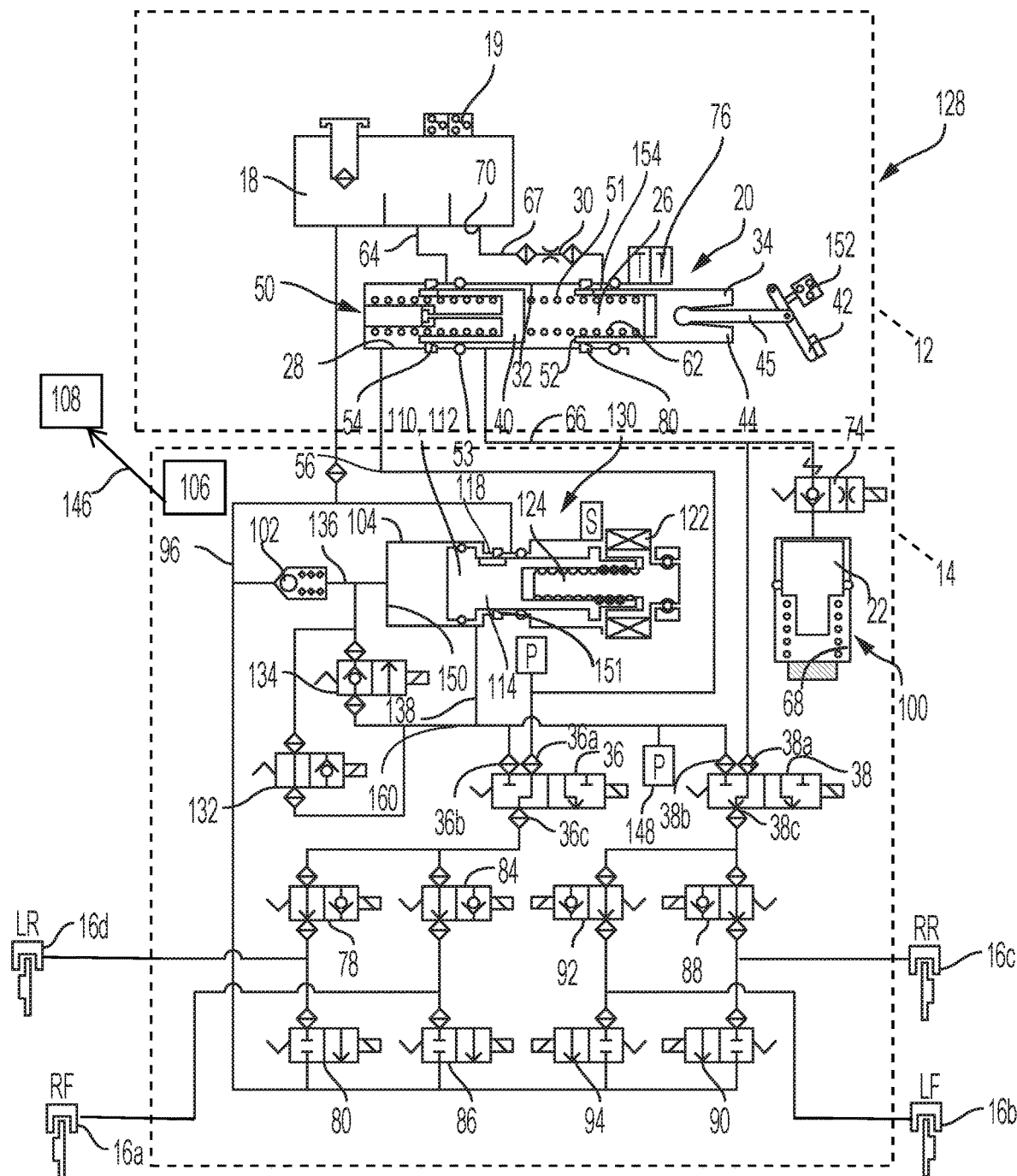
FIG. 2B is a schematic diagram of a second braking system according to the present disclosure where the simulator emptied of pressure medium and the piston is advanced within the simulator.

Referring now to FIGS. 2A-2B, an orifice (see element 30) may be implemented at the master cylinder 50 (in the conduit 67 between the venting port 154 of the first output pressure chamber 26 and the reservoir 18) instead of using a simulator test valve (see element 82 in FIGS. 1A and 1B) in the brake module (see element 14 in FIGS. 1A-1B). The system 128 shown in FIGS. 2A-2B may perform the following steps to determine if there is a leak in the simulator valve 74 (shown in FIGS. 2A-2B): (1) provide a simulator 100 (see FIG. 2A) which is only partially full of pressure medium and a de-energized simulator valve 74; (note: when de-energized, the simulator valve 74 only allows fluid to flow in one direction—from the simulator 100 towards conduit 66, but when energized, the simulator valve 74 may, but not necessarily, permit fluid to flow in both directions) (2) Energize the pumping valve 134, the secondary three way valve 36, and the apply valves 78, 84, 92, 88 so that all apply valves 78, 84, 92, 88 are closed (where pressure medium is only able to flow from the dump valves 80, 86, 94, 90 towards the corresponding three way valve 36, 38); (3) apply and retract the dual acting plunger (or piston) 110 in the plunger assembly 130 via at least two cycles (two apply/retract cycles) so that a predetermined pressure is achieved at the master cylinder secondary pressure sensor 98; (4) Hold the plunger 110 in position, but maintain the replenishing check valve 102 in a closed position this automatically happens when the plunger stops moving (to prevent pressure medium from flowing from the plunger assembly 130 to reservoir 18) while energizing the simulator valve 74 (to enhance medium flow from the simulator chamber 63 towards the orifice 30); (5) Measure master cylinder secondary pressure decay to obtain the measured master cylinder secondary pressure decay; (6) Compare measured master cylinder secondary pressure decay to a predetermined master cylinder secondary pressure decay value. (The predetermined master cylinder secondary pressure decay value may be taken from a master cylinder secondary pressure decay rate obtained when the system was new and the application of the master cylinder was used to verify that the simulator valve did not leak.); (7) If the measured master cylinder secondary pressure decay does not match the predetermined master cylinder secondary pressure decay, then then identify a leak in the simulator valve via a signal from the ECU to a vehicle user interface. (8) De-energize all the valves. It is understood that the system may optionally indicate that there is no leak in the simulator valve via a signal from the ECU to a vehicle user interface if the measured master cylinder secondary pressure decay does match the predetermined master cylinder secondary pressure decay.

In step 1 of the aforementioned method, the simulator 100 may be partially filled with pressure medium by energizing the pumping valve 134, the secondary three way valve 36, and the apply valves 78, 84, 92, 88 and then applying and retracting the plunger in the plunger assembly (while keeping the simulator valve open or energized) until the pressure in the second output pressure chamber of the master cylinder reads about 1.5 bar and then de-energize the simulator valve while completing the stroke of the plunger in the plunger assembly.

While various example, non-limiting embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A diagnostic method to identify a leak in a simulator valve for a vehicle brake system comprising the steps of:
   energizing a secondary three-way valve, a pumping valve, a simulator test valve, and a plurality of apply valves in order to maintain a pressure medium from a plunger assembly within a boost circuit;
   applying a plunger in the plunger assembly to a predetermined pressure level;
   holding the plunger in position within the plunger assembly; and
   identifying a leak in a simulator valve via a signal from an ECU to a vehicle user interface if the pressure in the boost circuit deteriorates at or more than a pre-determined rate.

2. The diagnostic method as defined in claim 1 wherein a reservoir for providing the pressure medium to the brake system is disposed in a first module while the simulator test valve is disposed in a second module separate from the first module.

3. The diagnostic method as defined in claim 2 wherein a boost pressure sensor is used to measure pressure in the boost circuit.

4. The diagnostic method as defined in claim 2 wherein the plunger applies pressure to the boost circuit upon actuation of a motor in the plunger assembly via an electronic control unit.

5. The diagnostic method as defined in claim 2 wherein a pressure sensor in the boost circuit measures the rate of pressure deterioration in the boost circuit.

6. The diagnostic method as defined in claim 2 wherein the step of energizing the plurality of apply valves prevents pressure medium from flowing from plurality of apply valves toward a corresponding plurality of dump valves, and energizing the simulation test valve blocks the flow of fluid or pressure medium in the direction from a simulation chamber of a pedal simulator in the second module to a first output pressure chamber of a master cylinder in the first module.

7. The diagnostic method as defined in claim 6 wherein the step of energizing the pumping valve enables the uni-directional flow of the medium to flow from the plunger assembly into the boost circuit.

8. The diagnostic method as defined in claim 6 further comprising the steps of:
   de-energizing the simulator test valve to release pressure in the boost circuit;
   energizing the simulator valve to enable uni-directional flow within the simulator valve from the pedal simulator to the boost circuit and energizing the simulator test valve to block the flow of fluid or pressure medium in the direction from the simulation chamber to the first output pressure chamber of the master cylinder;
   applying pressure to the pedal simulator via a plunger assembly until a predetermined pressure is achieved in the pedal simulator;
   holding a plunger in the plunger assembly in position and measuring a rate of pressure deterioration in the pedal simulator; and
   comparing the rate of pressure deterioration in the pedal simulator against a predetermined rate to identify a leak in the pedal simulator.

9. A diagnostic method to identify a leak in a simulator valve for a vehicle brake system comprising the steps of:
   energizing a secondary three-way valve, a pumping valve, a simulator test valve, and a plurality of apply valves in order to maintain a medium from a plunger assembly within a boost circuit;
   applying pressure to the boost circuit via a plunger in the plunger assembly to achieve a predetermined pressure level in the boost circuit;
   holding the plunger in position and measuring the pressure in the boost circuit;
   measuring a rate of pressure deterioration in the boost circuit; and comparing the rate of pressure deterioration against a predetermined value; and identifying a leak in the simulator valve via a signal from an ECU to a vehicle user interface if the plunger traveled more than a pre-determined distance within the plunger assembly when achieving the predetermined pressure level in the boost circuit.

10. The diagnostic method as defined in claim 9 wherein a reservoir for providing the medium to the brake system is disposed in a first module while the simulator test valve is disposed in a second module separate from the first module.

11. The diagnostic method as defined in claim 10 wherein a pressure sensor in the boost circuit measures the rate of pressure deterioration in the boost circuit.

12. The diagnostic method as defined in claim 10 wherein the pre-determined distance falls in the range of about 5 mm to about 20 mm.

13. The diagnostic method as defined in claim 10 wherein the plunger applies pressure to the boost circuit upon actuation of a motor in the plunger assembly via an electronic control unit.

14. The diagnostic method as defined in claim 10 wherein the step of energizing the plurality of apply valves prevents pressure medium from flowing from plurality of apply valves toward a corresponding plurality of dump valves, and energizing the simulation test valve blocks the flow of pressure medium in the direction from a simulation chamber of a pedal simulator in the second module to a first output pressure chamber of a master cylinder in the first module.

15. The diagnostic method as defined in claim 14 wherein the step of energizing the pumping valve enables the uni-directional flow of the pressure medium from the plunger assembly into the boost circuit.

16. The diagnostic method as defined in claim 14 further comprising the steps of:

de-energizing the simulator test valve to release pressure in the boost circuit;

energizing the simulator valve to enable uni-directional flow within the simulator valve from the pedal simulator to the boost circuit and energizing the simulator test valve to block the flow of fluid or pressure medium in the direction from the simulation chamber to the first output pressure chamber of the master cylinder;

applying pressure to the pedal simulator via a plunger assembly in a second module until a predetermined pressure is achieved in the pedal simulator;

holding a plunger in the plunger assembly in position and measuring a rate of pressure deterioration in the pedal simulator; and comparing the rate of pressure deterioration in the pedal simulator against a predetermined rate to identify a leak in the pedal simulator.

* * * * *